March 14, 1967
R. L. SHARP
3,308,629
CONTROLLED TEMPERATURE SYSTEM
Filed May 19, 1965
4 Sheets-Sheet 1
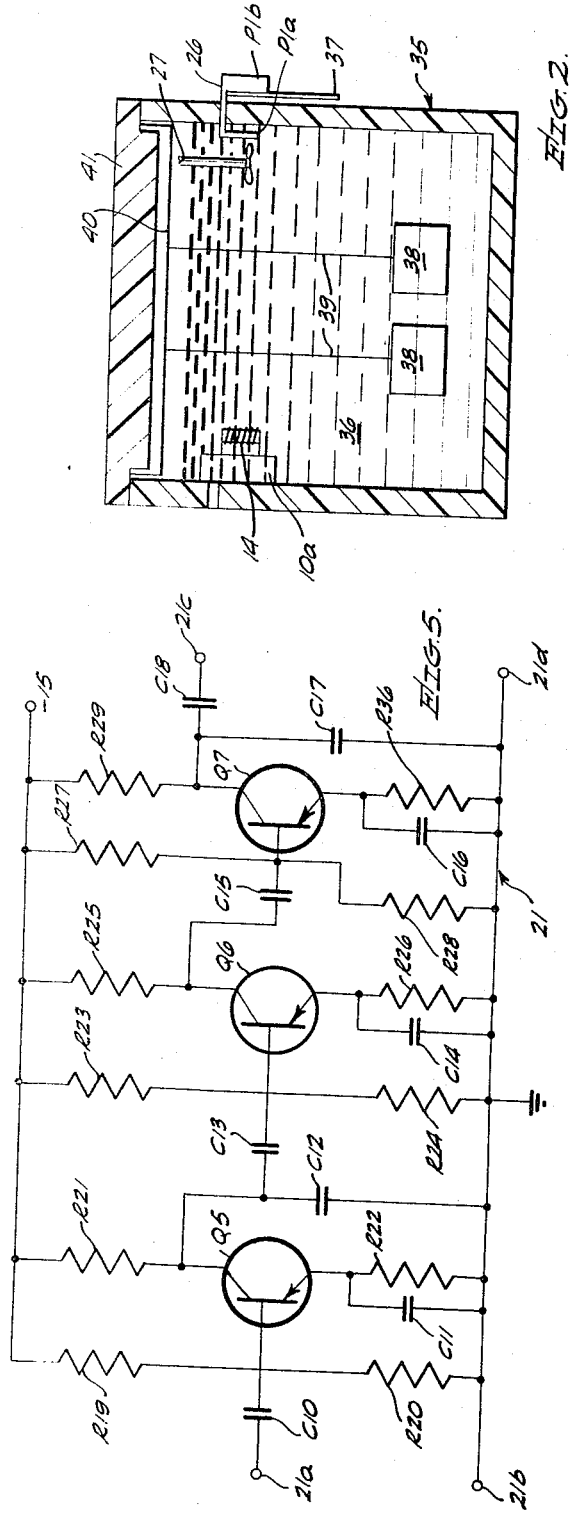
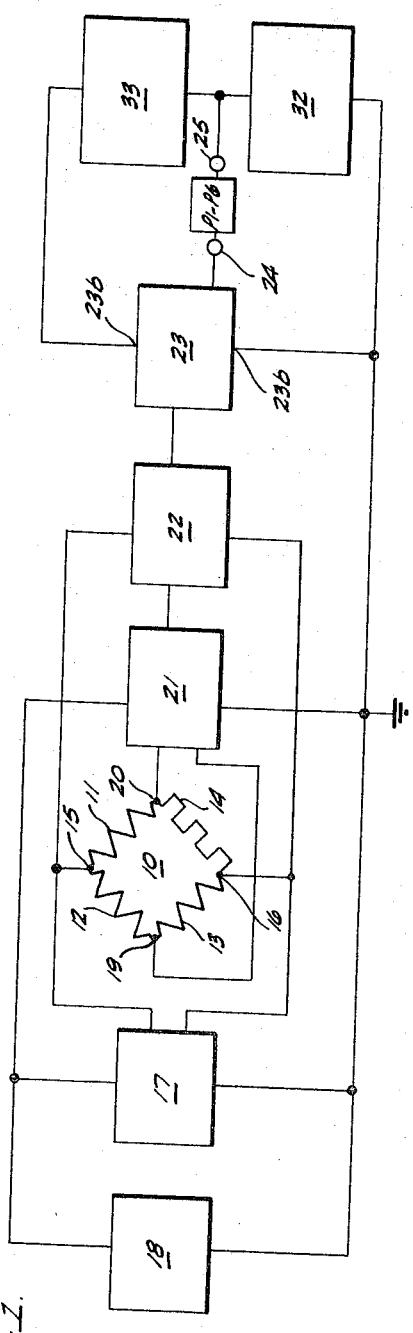
INVENTOR.
ROBERT L. SHARP,
BY
Charles S. Haughey
ATTORNEY

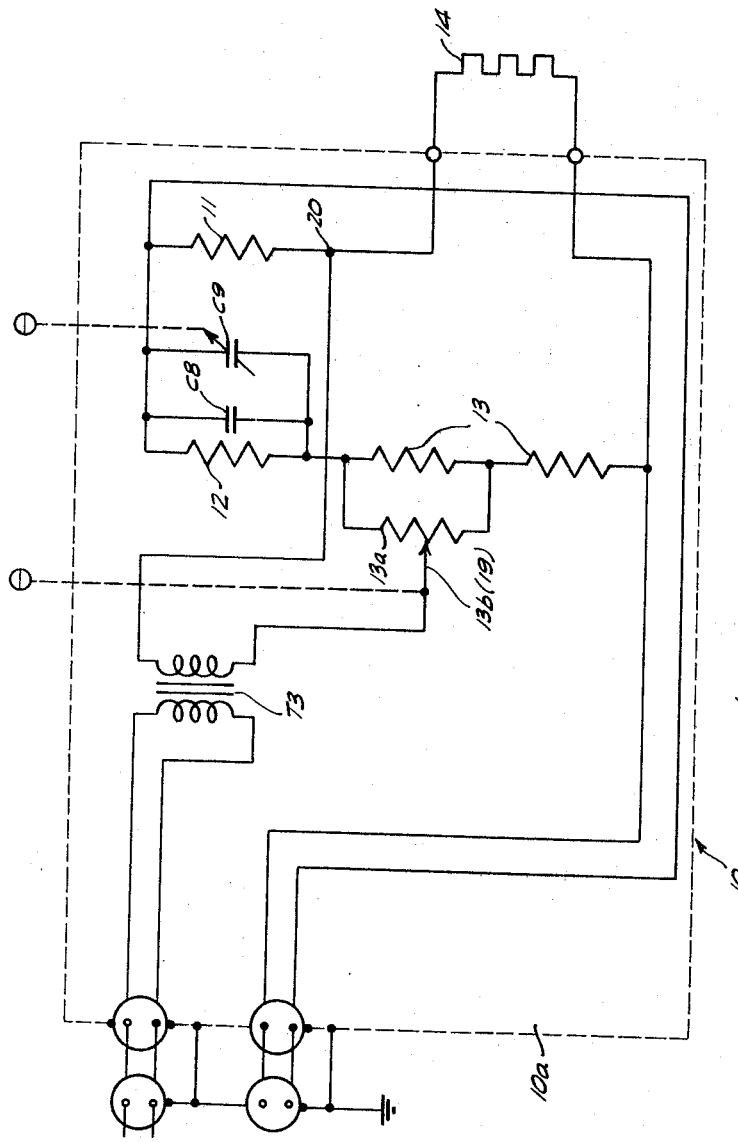

INVENTOR.
ROBERT L. SHARP,
BY
Charles N. Haughey
ATTORNEY.

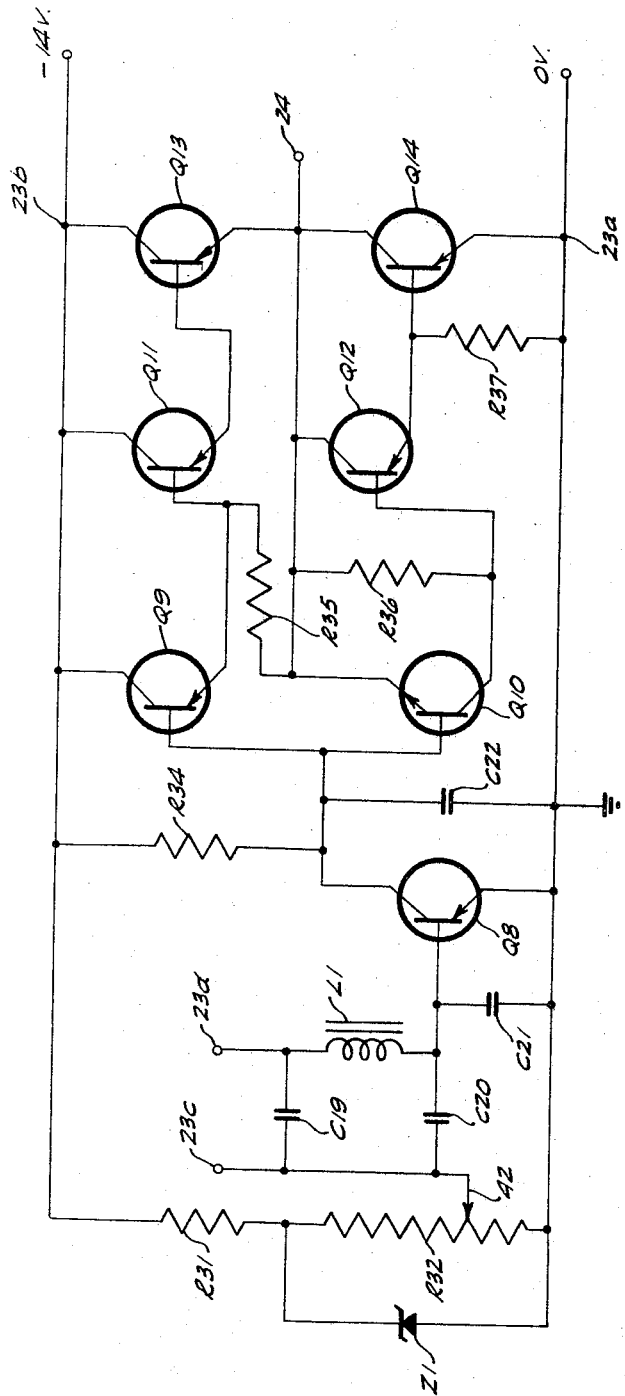

United States Patent Office 3,308,629
Patented Mar. 14, 1967

3,308,629
CONTROLLED TEMPERATURE SYSTEM
Robert L. Sharp, Los Angeles, Calif., assignor to Hughes Aircraft Company, Culver City, Calif., a corporation of Delaware
Filed May 19, 1965, Ser. No. 466,863
5 Claims. (Cl. 62—3)

This invention relates to a controlled temperature system especially useful in maintaining extremely precise temperature control within an environment, preferably insulated, suitable for use in measuring electrical characteristics and other temperature sensitive characteristics of materials and devices. The invention is explained herein in connection with the control of the temperature of a fluid medium such as the oil bath of a standardizing oil tank for measuring precisely the voltage of a standard secondary reference one volt cells.

In the application to the measurement of standard voltage reference cells it is desired to maintain an oil bath temperature at a precisely controlled standard temperature such as 28° C. and accurate to .001° C. to measure a nominal one volt to the nearest one-tenth microvolt, or .0000001 volt. This is most difficult. It is generally required to stir the oil mechanically to obtain temperature uniformity, and the mere stirring generates heat. Other variables are introduced into conventional temperature control systems where it is necessary to sense or measure a system temperature and in response thereto to activate or deactivate a heating or cooling source. Electrical contacts for such heating or cooling sources often chatter under such conditions giving a "saw-tooth" temperature curve which over-shoots and under-shoots the temperature control point. Such electrical contacts also tend to wear and to change characteristics with time, adding to the problems of temperature control. Valving systems requiring mechanical movement to control fuels or heating mediums tend to wear or stick and introduce inaccuracies into the temperature control system. Many thermostats for sensing the temperature of the environment to be controlled introduce inaccuracies; for example, very sensitive mercury type thermostats may be subject to loss of calibration or failure due to mercury coating. For thermocouple type devices sensitivity to temperature change at the remote junctions and aging characteristics of the thermocouple introduce intolerable inaccuracies.

This invention is designed to measure and control environmental temperature in a manner and with apparatus which avoids the introduction of identifiable sources of inaccuracy and which maintains extreme uniformity of temperature over extended periods of time with a minimum of attention or maintenance.

For consideration of what I believe to be novel and my invention, attention is directed to the following portion of this specification, including the drawing, which describes the invention in its presently preferred form, and the manner and process of making and using it.

In the drawing:

FIG. 1 is a block diagram illustrating apparatus according to this invention;

FIG. 2 is a schematic sectional view of a temperature controlled oil tank for standard measurement described herein to illustrate the preferred form of this invention;

FIG. 3 is a schematic diagram of a bridge circuit portion of apparatus according to FIG. 1;

FIG. 5 is a schematic diagram of an A.C. bridge amplifier circuit portion of the apparatus of FIG. 1; and FIG. 6 is a schematic diagram of a D.C. amplifier circuit portion of the apparatus of FIG. 1.

Figure 4:
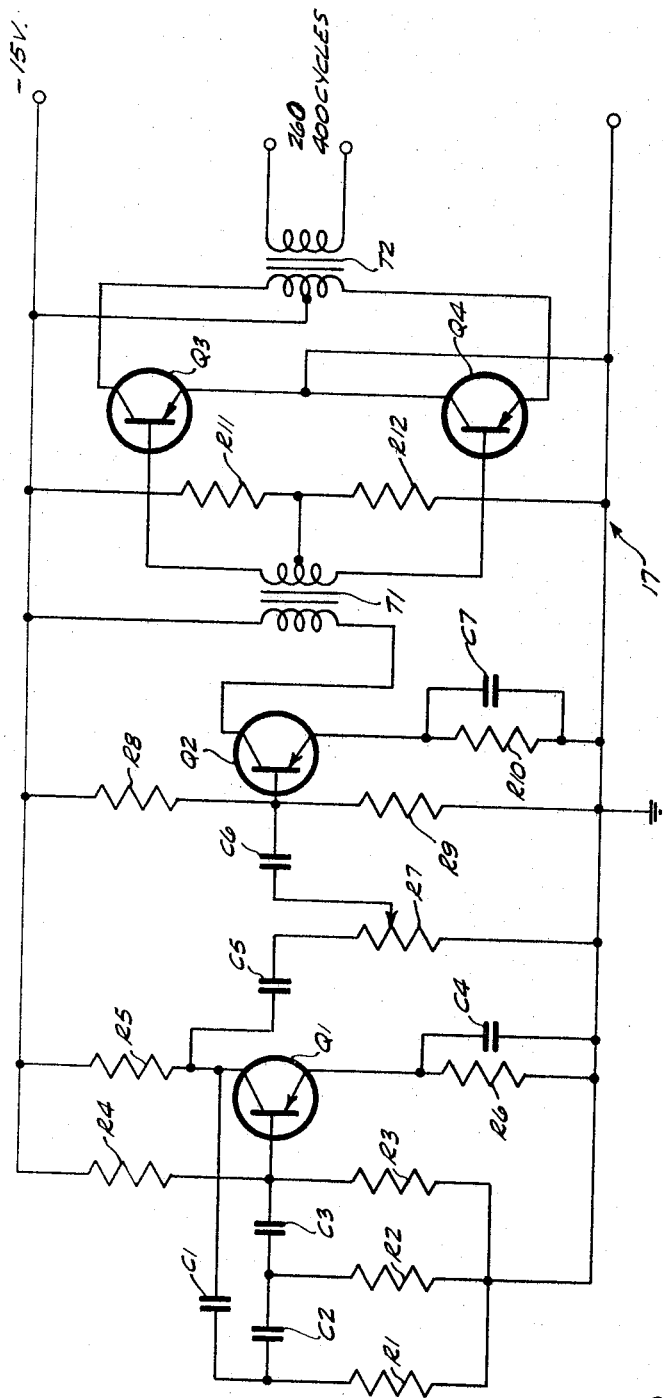
FIG. 4 is a schematic diagram of an oscillator amplifier portion of the apparatus of FIG. 1.

The environmental temperature controlled system herein illustrated in a presently preferred form comprises an electrical bridge circuit including for one leg thereof a stable and reliable thermo-sensitive sensor element, such as a substantially linearly responsive resistance wire, one or more thermoelectric elements having a first portion, or junction, in the environment to be controlled, a second junction outside that environment, and means responsive to unbalance of the bridge circuit resulting from an environmental temperature change, sensed by the sensor element, to adjust flow of current through the thermoelectric element in a direction and degree sufficient to cause heat exchange between the first and second junctions thereof in a manner to counteract the temperature change sensed by the sensor element.

With reference to FIG. 1 of the drawing, the temperature controller illustrated therein comprises an electrical bridge circuit 10 which includes three resistance elements 11, 12 and 13 connected in adjacent legs, the circuit being completed by a sensor element 14. Additional details of this bridge circuit appear in FIG. 3 and will be described at a later point. The input terminals to this bridge circuit are designated 15 and 16 and are coupled to the output circuit of a combination oscillator amplifier 17 which is energized from a conventional alternating current power supply circuit generally designated 18. The details of the oscillator amplifier 17 appear in FIG. 4 to be described. This oscillator may produce a 400 cycle electrical output, or any other preferred frequency not present in the vicinity. The bridge circuit has output terminals 19 and 20 which are coupled to the input circuit of a bridge amplifier 21 which may be a conventional A.C. amplifier one type of which is illustrated in FIG. 5. Electrical power for the bridge amplifier 21 is provided from the power supply 18 which also supplies the oscillator amplifier 17. The output of this amplifier is the amplified output of the bridge unbalance voltage and as such is in phase with the bridge unbalance voltage. The output circuit of the bridge amplifier 21 is coupled inputwise to a phase demodulator 22 of conventional design. Such a phase demodulator may be of the type disclosed in FIG. 11.19 of page 408 of volume 19 of the Radiation Laboratory Series, First edition, McGraw-Hill Book Co., Inc. which produces a D.C. output voltage of one polarity or the reverse, depending upon the instantaneous phase relationship of the bridge unbalance voltage to the power supply voltage produced by the oscillator amplifier 17.

The D.C. output voltage of the phase demodulator 22 is coupled inputwise to a direct current amplifier generally designated 23 which may be of a type specifically illustrated in FIG. 6 which is adjusted to produce zero output volts for that condition of the bridge circuit 10 in which its output (the input to the A.C. amplifier) is shorted so that there will be no current coupled to the electrical load. The electrical load is represented in a plurality of thermoelectric elements, such as Peltier P–N junction devices, P1–P6, having respective terminals one of which heats and the other of which cools for current flow in one direction and said one of which cools and said other of which heats for reverse current flow. Thermoelectric elements P1–P6 are connected in series across the circuit output terminals 24 and 25 to be energized by one polarity of D.C. output voltage of current or the reverse, depending upon the potential of the output terminal 24 in relation to the fixed potential of terminal 25. In this regard, if it is assumed that with a decreasing environmental temperature the impedance of the sensor element 14 diminishes, it may be assumed that the potential of the terminal 24 drops below that of the terminal 25, in which case current may be coupled to the thermoelectric cooling elements P1–P6 in a sense to generate heat at a selected terminal. As will be described in connection with FIG. 2, the selected terminals of the thermoelectric elements are disposed in heat exchange relationship with the environment in which the sensor element 14 is disposed. The introduction of heat to this environment raises its temperature, the increasing temperature increasing the impedance of the sensor element 14 to reduce the potential difference across the power supply terminals 24 and 25 coupled to the thermoelectric cooling elements. In the event of a rise in temperature in the environment in which the sensor element 14 is immersed, the increasing resistance results in a rise in potential at terminal 24 of the load circuit which produces current flow through the thermoelectric elements in a direction to cool the selected terminals thereof. This reduction in temperature coupled to the environment in which a sensor element 14 is immesed induces heat flow from the environment to the thermoelectric elements and cools the environment to thereby reduce the resistance of the sensor element which in turn results in a return of the potential of the output terminal 24 toward that of the terminal 25. Where the environment contains a heat load, such as a mechanical stirring device, it may be necessary to apply cooling to maintain 28° C. even though surrounded by a room nominally at 25° C. In this case a very fine control is obtained operating the thermoelectric elements as coolers, since IR losses tend to reduce the cooling effect. When operated as heaters, IR effects add to the thermoelectric heating, and the control is somewhat less fine. With a low mass sensor element 14 in the bridge circuit, this effect is not substantial. Power for energizing the thermoelectric elements is provided by individual direct current power supply sources generally designated 32 and 33, which may be batteries, which are poled in a series aiding relationship across a pair of power input terminals 23a and 23b of the direct current amplifier 23. In the arrangement illustrated the positive voltage terminal of a power supply circuit is connected to terminal 23a which, as indicated, is grounded, and the negative voltage terminal of the power supply circuit is connected to terminal 23b. The purpose of this will be apparent from FIG. 6.

A physical arrangement of the sensor element 14 and thermoelectric elements for controlling the temperature of a liquid environment is illustrated in FIG. 2 wherein a thermally insulated tank 35 may contain a liquid 36, such as oil, the temperature of which is to be very closely controlled. The entire bridge circuit 10, with the exception of the sensor element 14, may be mounted within a suitable hermetically sealed container or enclosure 10a which is completely immersed within the oil bath 36 as indicated. The sensor element 14 protrudes from the enclosure 10a to be in direct contact with the oil and of course is electrically connected, as indicated in FIG. 1, to the other elements of the bridge circuit. It may be mounted on an insulating support as shown. Electrical connections may be brought through sealed openings in the wall of the container. The thermoelectric elements P1–P6 are typically mounted as indicated at 26 in a position in which they extend through the wall of the container or otherwise suitably bridge the wall of the container 35 so that one junction or terminal, for example, P1a is mounted inside the container and the other junction P1b is disposed outside of the container 35. Alternatively, the first junction may be mounted on the outside surface of the tank, avoiding the need to penetrate the tank wall. The section of the thermoelectric element, including junction P1a internally of the container, is immersed in the oil bath. The section of the thermoelectric element including the junction or terminal P1b is in contact with a metallic plate 37 disposed externally of the container and functioning as a heat sink. A mechanical stirring device 27 may be disposed in the tank 35.

One application of this invention provides an oil bath having a precisely controlled temperature in which standard voltage cells 38, normally of the one volt type, may be suspended and tested in a constant temperature environment. Such a suspension may include elongated heat insulating supports 39 suspending the cells from a suitable overhead support 40 which bridges the upper end of the container. The container may or may not be closed with a cover 41 as required. The circuit will handle temperature excursions of several degrees above and below ambient in which the thermoelectric elements switch from heating to cooling and reverse. The oil 36 is normally maintained at a temperature of about 28° C., or 3 degrees above ambient of 25° C. room temperature. Because of heat generated by stirring mechanisms, it may be necessary to maintain a substantially constant cooling load. Hunting problems between heating and cooling by the thermoelectric element may be avoided by low mass design (rapid response) in the sensor unit 14.

Although conventional types of amplifiers and oscillators may be employed in a temperature controlling circuit of the type herein described, FIGS. 3 through 6 illustrate specific arrangements which have been employed in one embodiment.

In FIG. 4 details of the oscillator amplifier are indicated. This particular circuit has been designed to produce an electrical output of 26 volts at about 400 cycles. It comprises an oscillator section 1, including a transistor Q1, the output of which is coupled through capacitors C5 and C6 in a degree determined by the setting of the tap of a potentiometer R7, to the base of a transistor Q2 forming the active element of a buffer amplifier circuit. The output of the buffer amplifier circuit comprises the primary winding of a coupling transformer T1, the ends of the secondary winding of which are coupled to the respective bases of p-n-p transistors Q3 and Q4 connected in push-pull relationship and functioning as a power amplifier. The output circuit of this power amplifier circuit comprises a transformer T2, the secondary winding of which provides the 400 cycle 26 volt power for energizing the bridge circuit 10 and the phase demodulator circuit 22.

The bridge circuit 10 is generally illustrated in FIG. 3. Here the enclosure 10a is generally illustrated by the dotted outline, the sensor element 14 being disposed externally thereof, and the bridge resistance elements 11, 12 and 13 being disposed within the confines of this enclosure. In this illustration the resistance element 13 is comprised of two sections, the upper section of which is shunted by a potentiometer 13a, the adjustable tap 13b of which constitutes the output terminal 19 of the bridge as seen in FIG. 1. The output terminals 19 and 20 are coupled to the primary winding of a transformer T3, the secondary winding of which is used to couple the A.C. bridge unbalance voltage into the input circuits of the bridge amplifier 21. A capacitor C8 which shunts resistor 12 substantially balances the reactive component of bridge unbalance voltage and a trimmer capacitor C9, also connected in shunt with the resistor element 12, is used to trim the reactive component to provide precise bridge balance.

The bridge amplifier 21 is detailed in FIG. 5 and is essentially a three-stage capacitor coupled transistor amplifier Q5, Q6, Q7 employing three p-n-p type transistors Q5, Q6, Q7 as the active elements of the respective amplifier stages. Input terminals 21a and 21b of this A.C. amplifier are coupled to and energized by the output of the secondary winding of the transformer T3 of the bridge circuit. The output terminals 21c and 21d are coupled to the input terminals of the phase demodulator. In the reference to FIG. 11.19 of page 408 of Volume 19 of the Radiation Laboratory Series these output terminals would couple to the single input terminals of the referenced full-wave modulator.

The direct current amplifier 23 is illustrated in FIG. 6. Power for this amplifier is provided by the power supply circuit including the respective 7 volt power supply sources 32 and 33 illustrated in FIG. 1 which are connected in series aiding relationship to provide the indicated zero to minus 14 volt supply of energizing voltage across the terminals 23a and 23b. A reference voltage circuit for this amplifier includes a resistor type of voltage divider network coupled across the direct current voltage supply. The lower resistor section of this voltage divider network as illustrated is shunted by a zener diode generally designated Z1 which provides a relatively constant voltage drop across this lower section of the network. The electrical input to this amplifier is the output of the phase demodulator circuit 22 which is coupled to a pair of input terminals 23c and 23d as illustrated in FIG. 1. These terminals are coupled directly to an inductive-capacitive filter network, one end of which is coupled to an adjustable voltage tap 42 on the lower voltage regulated section of the voltage divider network and the output of this filter network is coupled directly to the base of a direct current transistor amplifier circuit comprising a p-n-p transistor Q8, the collector of which controls the bases of the complementary transistor pair Q9 and Q10, the collectors of which in turn control the bases of respective p-n-p transistors Q11 and Q12 which are emitter coupled to the respective bases of a pair of output transistors Q13 and Q14 of the p-n-p type.

The adjustments of this circuit, briefly described hereinabove, are particularly described at this point. The first adjustment is made by setting the value of the potentiometer R7 in the coupling circuit between the collector of the transistor Q1 and the base circuit of the transistor Q2 to a value that will provide the precise voltage required for energizing the bridge circuit. In this particular case this voltage was established at 26 volts and 400 cycles. A second adjustment is made in setting the resistive and reactive balance of the bridge circuit, as seen in FIG. 3 and as partially described therein, whenever the ambient temperature of the oil in the tank 35 is at 28.000° C. Resistor 11 is selected to be the correct value to balance the resistance of the sensor with the tap 13b of the potentiometer 13a set near the electrical center of its adjustment. For the circuit parameters chosen the capacitor C8 is chosen to the nearest 50 mmf. value necessary to balance the reactive component of the bridge unbalance voltage and thereafter the trimmer capacitor C9 is adjusted to exactly balance out the reactive component of bridge unbalance voltage. A third adjustment is the setting of the tap 42 in the lower section of the voltage divider network in FIG. 6 for zero load current with the output of the bridge circuit (input to the A.C. amplifier) short-circuited. With this adjustment the changing polarity output of the phase demodulator circuit at the input terminals 23c and 23d of the direct current amplifier 23 now adds and subtracts with respect to the voltage coupled to the base of the input transistor Q8 in this direct current amplifier circuit.

According to this embodiment of the invention the enclosure 10a hermetically seals those elements of the bridge circuit illustrated in FIG. 3. This sealed enclosure is filled with oil, or other suitable dielectric fluid, and the assembly is suspended in the oil bath 36 within the insulated tank 35 so that the sensor which is mounted outside of this sealed assembly is in intimate contact with the oil, the temperature of which is to be controlled. Provision may be made through mechanical connections 10e and 10f coupled to the adjustable tap 13b of the potentiometer 13a and to the adjustable member of the trimmer capacitor C9, respectively, so that adjustments of these units may be made after they have been placed in operation so that drift in the electrical parameters may be compensated.

The environmental temperature controlled system herein described is solid state from power supply to thermoelectric elements, and has no relay contacts or moving parts, and provides proportional control from the cooling mode to the heating mode, with, of course, a nonlinearity at the transfer point between cooling and heating. The system does not require a controlled reference temperature outside the system, and it may normally operate for many months or even years with no adjustment and with accuracies equal to or superior to those maintained for primary standards.

What I claim is:

1. An environmental fluid temperature controlled system comprising in combination:
    a fluid containing tank;
    an electrical bridge circuit including for one leg thereof a temperature sensitive resistance wire sensor element disposed in the environmental fluid to be controlled;
    a thermoelectric element having a first portion in the fluid to be controlled and second portion external to said tank; and
    means responsive to unbalance of the bridge circuit resulting from a fluid temperature change sensed by the sensor element to adjust the flow of current through the thermoelectric element in a direction and degree sufficient to cause heat exchange between the first and second portions thereof in a manner to counteract the temperature change sensed by the sensing element.

2. An environmental temperature control system comprising, in combination:
    an electrical bridge circuit comprising a temperature sensitive sensor element disposed within said environment and responsive to the temperature thereof;
    an A.C. power supply connected to the input terminals of the bridge circuit;
    a phase demodulator coupled with the output circuit of the bridge circuit to receive therefrom the output of the bridge unbalance voltage; and
    a thermoelectric element coupled with the phase demodulator, to receive therefrom a D.C. output voltage whose polarity depends upon the instantaneous phase relationship of the bridge unbalance voltage to the power supply voltage, and having a first junction disposed within the environment whose temperature is to be controlled and a second junction disposed outside said environment, in such a manner that the polarity of the D.C. current resulting from a change of resistance in the sensor element with a rise in environmental temperature energizes the thermoelectric element in a manner to remove heat from said first junction, thereby cooling the environment and to reject heat at said second junction.

3. An environmental temperature control system comprising, in combination:
    an electrical bridge circuit comprising three resistance legs of substantially stable resistance characteristics and a fourth leg comprising a temperature sensitive resistance sensor element disposed within said environment and responsive to the temperature thereof;
    an A.C. power supply connected to the input terminals of the bridge circuit;
    an A.C. bridge amplifier coupled to the output terminals of the bridge circuit;
    a phase demodulator coupled to the output circuit of the bridge amplifier to receive therefrom the amplified output of the bridge unbalance voltage;
    a D.C. amplifier coupled to the phase demodulator to receive therefrom a D.C. output voltage whose polarity depends upon the instantaneous phase relationship of the bridge unbalance voltage to the power supply voltage; and
    a thermoelectric element coupled to the direct current amplifier and having a first junction disposed within the environment whose temperature is to be controlled and a second junction disposed outside said environment, in such a manner that the polarity of the D.C. current resulting from a change of resistance in the sensor element with a rise in environmental temperature energizes the thermoelectric element in a manner to remove heat from said first junction, thereby cooling the environment, and to reject heat at said second junction.

4. A solid state environmental temperature control system comprising in combination:
   an electrical bridge circuit comprising three resistance legs of substantially thermally stable resistance characteristics and a fourth leg comprising a temperature sensitive resistance sensor element disposed within said environment and responsive to the temperature thereof;
   an A.C. power supply connected to the input terminals of the bridge circuit;
   a solid state A.C. bridge amplifier coupled to the output terminals of the bridge circuit;
   a solid state phase demodulator coupled to the output circuit of the bridge amplifier to receive therefrom the amplified output of the bridge unbalance voltage;
   a solid state D.C. amplifier coupled to the phase demodulator to receive therefrom a D.C. output voltage whose polarity depends upon the instantaneous phase relationship of the bridge unbalance voltage to the power supply voltage; and
   a thermoelectric element coupled to the direct current amplifier and having a first junction disposed within the environment whose temperature is to be controlled and a second junction disposed outside said environment, in such a manner that the polarity of the D.C. current resulting from a change of resistance in the sensor element with a rise in environmental temperature energizes the thermoelectric element in a manner to remove heat from said first junction, thereby cooling the environment, and to reject heat at said second junction, said second thermoelectric junction being mounted on an extended surface heat sink to absorb heat therefrom.

5. Apparatus for controlling the temperature of an environment comprising in combination:
   a temperature sensitive resistance wire sensor element of an electrical bridge circuit disposed within said environment and responsive to the temperature thereof;
   an A.C. power supply connected to the input terminals of the bridge circuit;
   an A.C. bridge amplifier coupled to the output terminals of the bridge circuit;
   a phase demodulator coupled to the output circuit of the bridge amplifier to receive therefrom the amplified output of the bridge unbalance voltage;
   a D.C. amplifier coupled to the phase demodulator to receive therefrom a D.C. output voltage whose polarity depends upon the instantaneous phase relationship of the bridge unbalance voltage to the power supply voltage; and
   a thermoelectric element coupled to the direct current amplifier with a first junction disposed within the environment whose temperature is to be controlled and a second junction disposed outside said environment, in such a manner that the polarity of the D.C. current resulting from a change of resistance in the sensor element with a rise in environmental temperature energizes the thermoelectric element in a manner to remove heat from said first junction, thereby cooling the environment, and to reject heat at said second junction.

References Cited by the Examiner
UNITED STATES PATENTS

| 3,121,998 | 2/1964 | Nogata | 62—3 |
| 3,152,451 | 10/1964 | Downs | 62—3 |
| 3,206,937 | 9/1965 | Walisch | 62—3 |

WILLIAM J. WYE, *Primary Examiner.*